United States Patent
Akenine-Moller et al.

(10) Patent No.: US 9,396,582 B2
(45) Date of Patent: Jul. 19, 2016

(54) FIVE-DIMENSIONAL RASTERIZATION WITH CONSERVATIVE BOUNDS

(75) Inventors: Tomas G. Akenine-Moller, Lund (SE); Jim K. Nilsson, Lund (SE); Carl J. Munkberg, Malmo (SE)

(73) Assignee: Intel Corporation, Santa Clara, CA (US)

( * ) Notice: Subject to any disclaimer, the term of this patent is extended or adjusted under 35 U.S.C. 154(b) by 155 days.

(21) Appl. No.: 13/992,911

(22) PCT Filed: Dec. 30, 2011

(86) PCT No.: PCT/US2011/068055
§ 371 (c)(1),
(2), (4) Date: Jun. 10, 2013

(87) PCT Pub. No.: WO2013/101167
PCT Pub. Date: Jul. 4, 2013

(65) Prior Publication Data
US 2014/0015835 A1    Jan. 16, 2014

(51) Int. Cl.
*G06T 15/50* (2011.01)
*G09G 5/00* (2006.01)
*G06T 15/80* (2011.01)
*G06T 15/00* (2011.01)

(52) U.S. Cl.
CPC .............. *G06T 15/80* (2013.01); *G06T 15/005* (2013.01); *G06T 2210/12* (2013.01); *G09G 2320/10* (2013.01); *G09G 2360/122* (2013.01)

(58) Field of Classification Search
None
See application file for complete search history.

(56) References Cited

U.S. PATENT DOCUMENTS

| | | |
|---|---|---|
| 7,808,503 B2 | 10/2010 | Duluk, Jr. |
| 8,089,486 B2 | 1/2012 | Anderson |
| 2005/0225670 A1 | 10/2005 | Wexler |

OTHER PUBLICATIONS

Laine et al. "Clipless Dual-Space Bounds for Faster Stochastic Rasterization", ACM Transactions on Graphics, vol. 30, No. 4, Article 106, Publication date Jul. 2011.*
Laine "Split-Plane Shadow Volumes", Graphics Hardware 2005.*
Regan-Kelley et al. "Decoupled Sampling for Graphics Pipelines", ACM Transactions on Graphics, vol. 30, No. 3, Article 17, published May 2011.*
Akenine-Moller et al. "Stochastic Rasterization using Time-Continuous Triangles", Graphics Hardware 2007.*
Hertel et al., "A Hybrid GPU Rendering Pipeline for Alias-Free Hard Shadows", Eurographics 2008.*
Laine, S., et al., "Improved Dual-Space Bounds for Simultaneous Motion and Defocus Blur," NVIDIA Technical Report NVR-2011-004. Nov. 2011, pp. 1-3.
PCT International Search Report and Written Opinion issued in corresponding PCT/US2011/068055 dated Sep. 14, 2012 (10 pages).
TW Search report in corresponding application No. TW101149550 dated Feb. 5, 2015 (2 pages) [w/English translation].

(Continued)

*Primary Examiner* — Yingchun He
(74) *Attorney, Agent, or Firm* — Trop Pruner & Hu, P.C.

(57) ABSTRACT

A per-tile test in the 5D rasterizer outputs intervals for both lens parameters, (u,v), and for time, t, as well as for depth z. These intervals are conservative bounds for the current tile for 1) the visible lens region, 2) the time the triangle overlaps the tile, and 3) the depth range for the triangle inside the tile.

25 Claims, 3 Drawing Sheets

(56) References Cited

OTHER PUBLICATIONS

Laine, S., et al., "Clipless Dual-Space Bounds for Faster Stochastic Rasterization," ACM Transactions on Graphics, vol. 30, Issue 4, Jul. 2011 (8 pages).

McGuire, M., et al., Colored Stochastic Shadow Maps, I3D, 11 Symposium on Interactive 3D Graphics and Games Feb. 18-20, 2011, (12 pages).

* cited by examiner

FIVE-DIMENSIONAL RASTERIZATION WITH CONSERVATIVE BOUNDS

BACKGROUND

This relates to graphics processing and particularly to the graphical depiction of motion blur.

Motion blur is an important visual effect that reduces temporal aliasing and makes moving content appear smoother. However, efficient rendering of motion blur in real-time three-dimensional graphics is nontrivial. In stochastic rasterization of motion blur, moving geometric primitives are sampled in both space and time, using a large set of samples to obtain high-quality motion-blurred images with low noise levels. For each of the sample positions, an inside test is executed to determine whether the moving primitive covers the sample. This overlap test in x, y and t space is generally more expensive than an inside test in traditional rasterizers.

A stochastic rasterizer that supports simultaneous motion blur and depth of field executes visibility tests for each triangle in a five dimensional (5D) domain (x,y,u,v,t). This domain consists of spatial positions (x,y), lens coordinates (u,v) and time t. These visibility tests are computationally much more expensive than a single visibility test in standard 2D rasterization. Additionally, for each triangle, many (e.g. 16-64) such tests are executed per pixel to obtain images with low noise levels.

Five-dimensional (5D) rasterization is expected to become part of DirectX and OpenGL at some point in the future. This will enable us to render images with accurate and correct depth of field and motion blur.

BRIEF DESCRIPTION OF THE DRAWINGS

Some embodiments are described with respect to the following figures.

DETAILED DESCRIPTION

Figure 1:
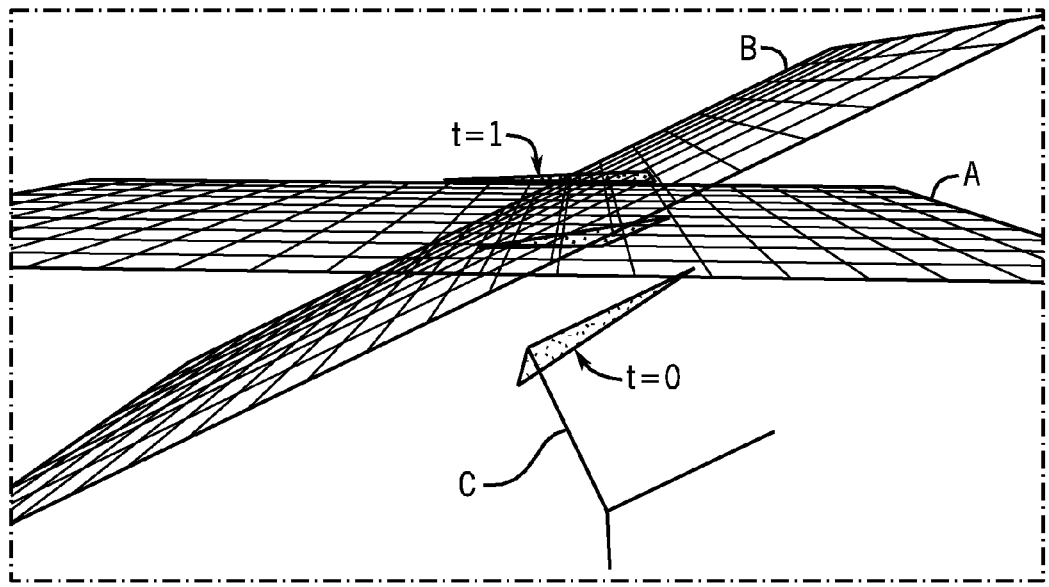
FIG. 1 is a screen shot from an interactive visualizer according to one embodiment.

A per-tile test in the 5D rasterizer outputs intervals for both lens parameters, (u,v), and for time, t, as well as for depth z. These intervals are conservative bounds for the current tile for 1) the visible lens region, 2) the time the triangle overlaps the tile, and 3) the depth range for the triangle inside the tile.

This output can be sent (when needed) further down the graphics pipeline to the pixel shader, and used for various things by the application developer. The interesting thing is that this results in a conservative 5D rasterizer. Previously, we have only had access to conservative 2D rasterization. This invention extends this to a whole new domain and, as a starting point, we have discovered that conservative 5D rasterization with such outputs can be used for dynamic collision detection and caustics rendering on the graphics processor. Dynamic collision detection on the graphics processor has not been done before, as far as we know, and the caustics rendering solution that we have thought of will be more efficient than previous methods.

In addition, we present a new way to compute a conservative depth interval over a moving triangle. This makes occlusion culling more efficient, and saves both computer resources, as well as memory bandwidth usage in some embodiments.

We present a method for computing conservative depth over a motion blurred triangle over a tile of pixels. This is useful for occlusion culling ($z_{min}/z_{max}$-culling) and conservative rasterization, as well as a number of other techniques, such as dynamic collision detection on the graphics processor, and caustics rendering.

Usually, a moving vertex is described by $p_i=(1-t)q_i+tr_i$, $t \in [0,1]$, and a moving triangle is described by $p_0p_1p_2$. Hence, we have a triangle $q_0q_1q_2$ at t=0 and $r_0r_1r_2$ at t=1.

We assume that points, e.g., p, are two-dimensional homogeneous coordinates, i.e., $p=(p_x,p_y,p_w)$. We derive conservative depth in terms of the w-coordinate. Later, we show how the desired normalized depth, z/w, can be computed only from knowing the value of w, when standard projection matrices of OpenGL and DirectX are used.

We will present two ways to compute conservative depth over a tile (e.g., a block of pixels). The power of these two methods may be combined, resulting in a tighter conservative depth in some embodiments.

A plane equation is computed through the triangle at time t=0 (t=1). That plane is moved with constant speed as a function of time, such that it always has the moving triangle on one side of the plane. In the following, we will describe how we compute a moving plane equation which has larger depth than the moving triangle. Hence, this is useful for computing maximum depth ($w_{max}^{tri}$). Similar techniques can be used to compute minimum depth ($w_{min}^{tri}$).

First, we compute the static plane equation of the triangle at t=0. The plane normal is given by:

$$n_0=(q_2-q_0)\times(q_1-q_0). \qquad (1)$$

To make sure we move the plane in the right direction, we negate $n_0$ if $n_{0w}<0$. The plane equation is then: $\pi_o$: $n_0 \cdot o + d_0$, where $d_0 = n_0 \cdot q_0$, and o is an arbitrary point on the plane. Next, we compute the velocity $v_0$.

$$v_0 = -\max_i(n_0 \cdot r_i + d_0), \qquad (2)$$
$$i \in \{0, 1, 2\},$$

which is the maximum signed distance from the plane, $\pi_0$, over the vertices of the moving triangle at t=1. At this point, we have created a moving plane equation, which moves in the direction of the plane normal:

$$\Pi_0(t): n_0 \cdot o + d_0 + v_0 t = 0. \qquad (3)$$

As can be seen, we have added the term $v_0 t$, which ensures (by construction) that the triangle is "below" the moving plane equation, $\Pi_0(t)$. If $\Pi_0(t)$ does not sweep through the camera origin, e.g.

$$d_0 + v_0 t \neq 0 \cdot t \in [0,1], \qquad (4)$$

then $\Pi_0(t)$ has greater depth than the moving triangle at all times, $t \in [0,1]$. Any ray from the camera that intersects the triangle will intersect the triangle before intersecting the plane.

Sometimes, the plane equation of the triangle at t=1 provides a better plane equation to work with. In fact, in most cases, the triangle plane at t=0 is better in the beginning, and towards the end of the time interval, the triangle plane at t=1 is better. Hence, we want to derive a way of using the plane equation at t=1 as well.

The plane normal at t=1 is:

$$n_1 = (r_2 - r_0) \times (r_1 - r_0). \quad (5)$$

Again, we negate $n_1$ if $n_{1_w} < 0$. To make sure that the triangle at t=0 is on the right side of the new plane equation (with $n_1$ as normal), we need to compute the dot products between the normal, $n_1$, and the vertices of the triangle at t=0 in order to compute $d_1$:

$$d_1 = \min_i (-n_1 \cdot q_i), \quad (6)$$

$$i \in \{0, 1, 2\}.$$

The plane equation is then: $\pi_1 : n_1 \cdot o + d_1$. The velocity, $v_1$, of the moving plane is computed in the same way as above:

$$v_1 = -\max_i (n_1 \cdot r_i + d_1), \quad (7)$$

$$i \in \{0, 1, 2\}.$$

The moving plane equation becomes:

$$\Pi_1(t) : n_1 \cdot o + d_1 + v_1 t = 0. \quad (8)$$

Again, we also test for overlap between $\Pi_1(t)$ and the camera origin $d_1 + v_1 t \neq 0 \ \forall t \in [0,1]$ to ensure that the plane is a conservative approximation of $w_{max}^{tri}$.

At this point, we have two plane equations, $\Pi_0$ and $\Pi_1$, which move at constant velocities, and the next step is to evaluate the depth of these moving plane equations over a tile. The depth at a tile corner, (x, y), is computed as:

$$w_i(x, y, t) = -\frac{d_i + v_i t}{n_i \cdot (x, y, 1)}. \quad (9)$$

Note that when the denominator becomes zero, the plane of the triangle goes through the view point, and we simply do not use such planes when computing conservative depth.

The correct way to compute conservative maximum depth over a tile with four corners is then to take the maximum depth of eight locations, (x, y, t), namely, each of the four tile corners, but also both at time t=0 and t=1. However, since the equation was designed to be efficient to evaluate, it suffices to evaluate the depth at one location. This is described next. If $v_i > 0$, we only need to evaluate depth at t=1, and vice versa. The sign of the x- and y-components of the normal is used to select one corner out of the remaining four. For example, if $n_x > 0$ and $n_y < 0$, we would pick the one of the left corners of the tile (since $n_x > 0$), and out of those two, we would select the topmost corner (since $n_y < 0$). This makes it all very efficient.

For each moving plane, $\Pi_0$ and $\Pi_1$, we generate one maximum depth-value, say, $w_0^\Pi$ and $w_1^\Pi$, using the technique described above. The tightest $w_{max}^{tri}$ depth over the tile is then selected as the minimum of these:

$$w_{max}^\Pi = \min(w_0^\Pi, w_1^\Pi). \quad (10)$$

and similar computations are done to calculate $w_{min}^\Pi$.

Note that we can use a further optimization if we use a rasterizer that visits tiles and computes time intervals $\hat{t} = [\underline{t}, \bar{t}]$, indicating that there is the possibility that the tile overlaps with the moving triangle. Instead of evaluating $\Pi_0$ and $\Pi_1$ at t=0 and t=1 as described above, we evaluate at t=$\underline{t}$ and t=$\bar{t}$.

In FIG. 1, we have interpolated the triangle to t=0.5, which is located in the middle between t=0 and t=1. The grids A and B show the two planes, $\Pi_0$ and $\Pi_1$ at t=0.5. In this case, both lie above the interpolated triangle. The axis C is the w-axis.

Figure 2:
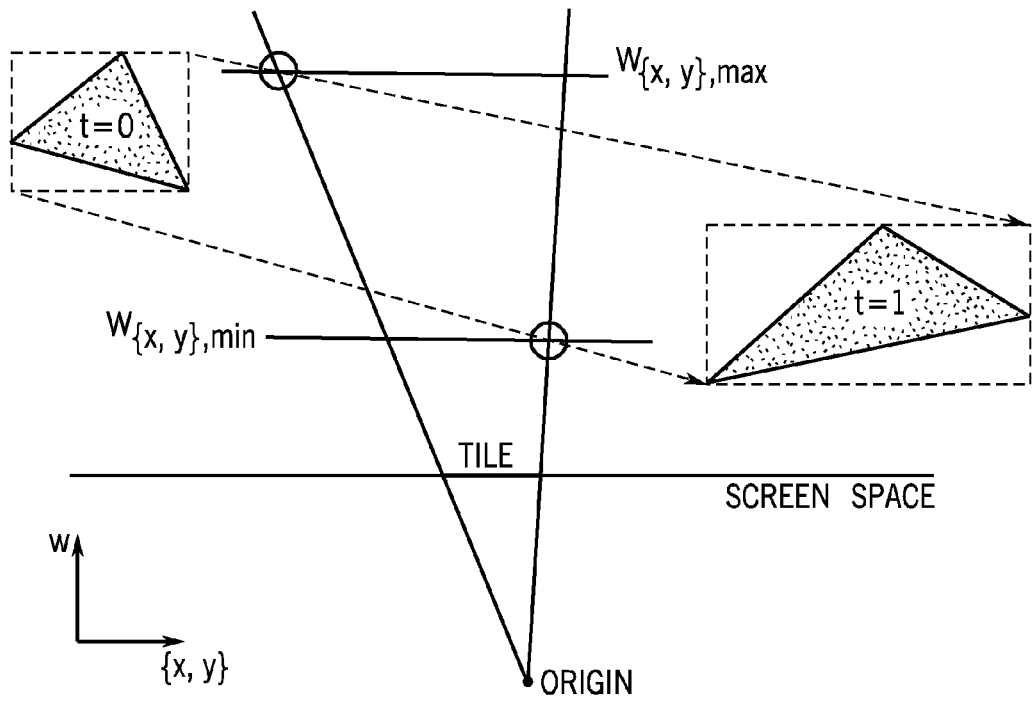
FIG. 2 is a depiction of the construction of a moving axis-aligned bounding box according to one embodiment.

As seen in FIG. 2, we construct a moving axis-aligned bounding box (AABB) for the triangle by interpolating its AABB's between times t=0 and t=1. For the closest and farthest quadrilateral faces of the AABB, we compute the intersection times $\hat{t}_i = [\underline{t}, \bar{t}]$ with the planes $\pi_i$ of the tile frustum. The tile frustum planes pass through the origin and are aligned to the sides of the tile.

Given a moving vertex of the farthest quadrilateral face, $p_n = (1-t)q_n + tr_n$, the times at which the AABB's intersect with the tile frustum planes $n_i \cdot p_n = 0$, are given by:

$$t = \frac{n_i \cdot q_n}{n_i \cdot (q_n - r_n)}. \quad (11)$$

Of the four moving vertices of a quadrilateral face, we select the one that is farthest from $\pi_i$ in the negative direction.

Subsequently, $\underline{w}_{max}$ is calculated for $[\underline{t}, \bar{t}]$ as (shown here for $\underline{t}$):

$$\underline{w}_{max} = (1-\underline{t})w_{max}^{t=0} + \underline{t} w_{max}^{t=1} \quad (12)$$

and similarly for $\bar{w}_{max}$. Then, the final maximum value using this technique is computed as:

$$w_{max} = \max(\underline{w}_{max}, \bar{w}_{max}). \quad (13)$$

Analogous computations would be done to compute the minimum depth, and then $w_{min} = \min(\underline{w}_{min}, \bar{w}_{min})$. Note that this procedure has to be performed for both the x and y tile directions.

An alternative is to calculate the times $\hat{t}_i = [\underline{t}, \bar{t}]$ when the moving AABB intersects the tile frustum planes using the n-vertices, and use these times to calculate $w_{\{min, max\}}$ for $\underline{t}$ and $\bar{t}$. These bounds on depth would however be slightly more conservative than when using the closest and farthest quadrilateral faces.

Up until now, our formulae have computed depth in w, but for OpenGL and DirectX, we usually need the normalized depth: z/w. Given a point, p, in eye space, we can apply standard projection matrices from DirectX. The z and w after projection are expressed as:

$$z = ap_z + bp_w = ap_z + b \quad (14)$$

$$w = p_z,$$

where $$a = \frac{Z_{far}}{Z_{far} - Z_{near}}$$

and $b = -aZ_{near}$, a, b > 0. In all our derivations, we have computed w ($= p_z$), and as a consequence, we can compute z=aw+b. This in turns means that, given w, we can compute the desired normalized depth, z/w, as z/w=(aw+b)/w.

Note that w(t) and $$\frac{z(t)}{w(t)} = a + \frac{b}{w(t)}$$

have local minima at the same t only if $w(t) \neq 0$ $\forall t \in [0,1]$, as $$a + \frac{b}{w(t)}$$

with b>0 is strictly increasing as a function of w for w≠0.

If we compute a maximum normalized depth, $Z_{max}^I = z_{max}^I / w_{max}^I$, using one technique (e.g., using Equation (11)), and another maximum normalized depth, $Z_{max}^{II} = z_{max}^{II} / w_{max}^{II}$ (e.g., using Equation (14)), then we can compute the combined "best" depth as the minimum of the two:

$$Z_{max}^{best} = \min(Z_{max}^I, Z_{max}^{II}), \quad (15)$$

and vice versa for $Z_{min}^{best}$. This applies to any number of argument to the min-function as long as the parameters represent conservative depths.

This work may be extended to depth of field. Equation (9) can suddenly become zero for many more cases due to that we now have a lens with finite extents to handle. Detecting whether a triangle plane intersects with a convex polygonal lens can be done by computing signed distances from the lens vertices to the plane equation. If there is at least one with positive and one with negative distance, then the plane intersects the lens, and we simply disable the usage of that plane. We can also use a bounding box around the lens shape and use the vertices of the bounding box for the computations described just above.

If the plane does not intersect the lens, we need to compute the depth through the tile corners. However, instead of starting the computations from the origin (where the pinhole camera is assumed to be located), we need to do this for all four corners of the bounding box of the lens shape.

Also, we can also use information from the tile-visiting rasterizer, t̂, and use that to tighten the conservative depth further.

Figure 3:
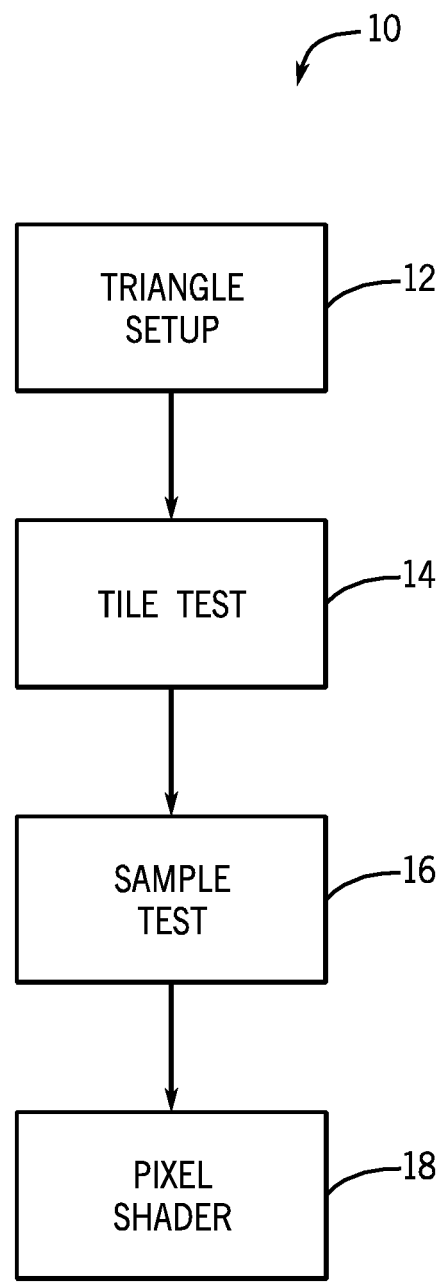
FIG. 3 is a flow chart for one embodiment.

In accordance with some embodiments, a sequence 10 shown in FIG. 3 may be implemented in software, firmware and/or hardware. In software and firmware embodiments it may be implemented by computer executed instructions stored in a non-transitory computer readable medium such as optical, magnetic or semiconductor storage.

In one embodiment, the sequence of FIG. 3 begins with a triangle set-up stage 12. The per-triangle constants needed for bounding are computed. Next a tile test 14 is performed. In the tile test, u, v, t and z intervals are computed for each tile. A tile is rejected if it is outside the valid range in any of the intervals. Then the u, v and t intervals are used to reject individual samples as shown in block 16. Finally, in the pixel shader, block 18, the u, v, t and z intervals are made available for the pixel shader. This allows for new algorithms in the pixel shader such as caustics rendering and dynamic collision detection.

Figure 4:
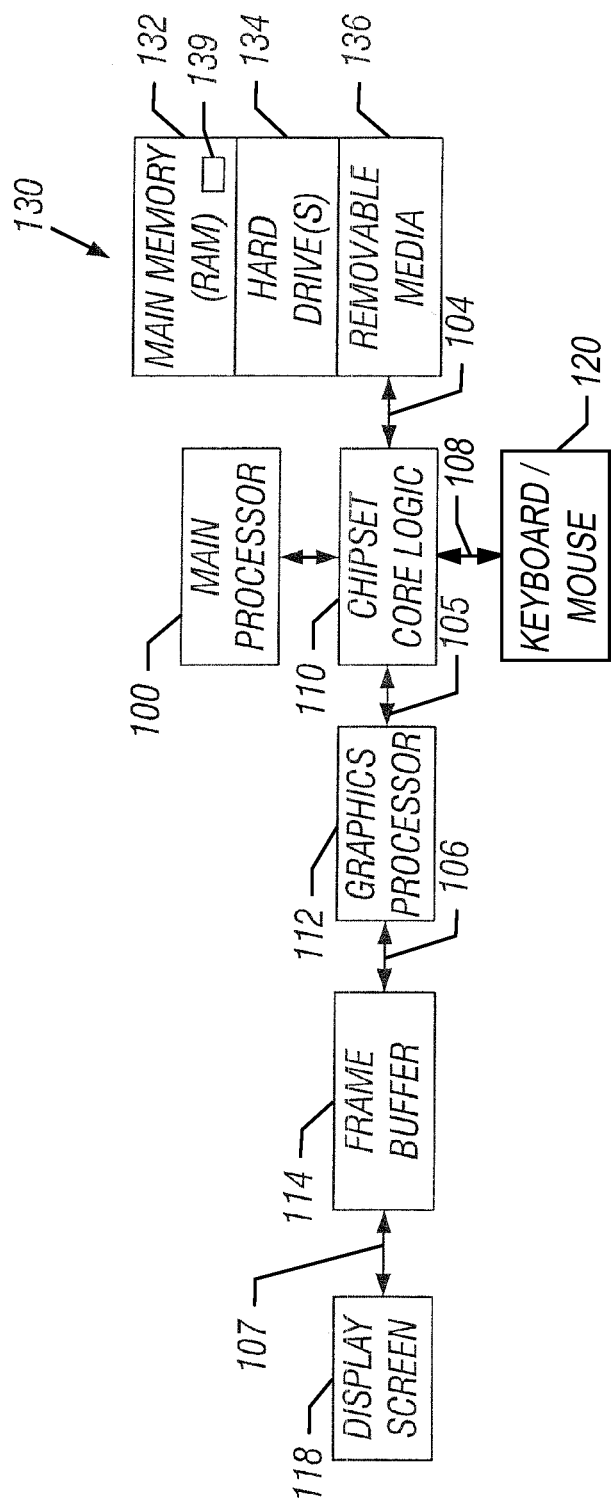
FIG. 4 is a schematic depiction for one embodiment.

The computer system 130, shown in FIG. 4, may include a hard drive 134 and a removable medium 136, coupled by a bus 104 to a chipset core logic 110. The computer system may be any computer system, including a smart mobile device, such as a smart phone, tablet, or a mobile Internet device. A keyboard and mouse 120, or other conventional components, may be coupled to the chipset core logic via bus 108. The core logic may couple to the graphics processor 112, via a bus 105, and the central processor 100 in one embodiment. The graphics processor 112 may also be coupled by a bus 106 to a frame buffer 114. The frame buffer 114 may be coupled by a bus 107 to a display screen 118. In one embodiment, a graphics processor 112 may be a multi-threaded, multi-core parallel processor using single instruction multiple data (SIMD) architecture.

In the case of a software implementation, the pertinent code may be stored in any suitable semiconductor, magnetic, or optical memory, including the main memory 132 (as indicated at 139) or any available memory within the graphics processor. Thus, in one embodiment, the code to perform the sequences of FIG. 5 or 6 may be stored in a non-transitory machine or computer readable medium, such as the memory 132, and/or the graphics processor 112, and/or the central processor 100 and may be executed by the processor 100 and/or the graphics processor 112 in one embodiment.

FIG. 3 is a flow chart. In some embodiments, the sequences depicted in these flow charts may be implemented in hardware, software, or firmware. In a software embodiment, a non-transitory computer readable medium, such as a semiconductor memory, a magnetic memory, or an optical memory may be used to store instructions and may be executed by a processor to implement the sequences shown in FIG. 3.

The graphics processing techniques described herein may be implemented in various hardware architectures. For example, graphics functionality may be integrated within a chipset. Alternatively, a discrete graphics processor may be used. As still another embodiment, the graphics functions may be implemented by a general purpose processor, including a multicore processor.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
computing depth intervals, using a moving plane equation having a depth greater than that of a moving and defocused triangle, for a plurality of tiles for said moving and defocused triangle;
rejecting a tile if it is outside a valid range in a depth interval; and
rendering an image without said one or more rejected tiles determined from said computed depth intervals for a graphic processor to obtain high quality motion-blurred images.

2. The method of claim 1 including computing depth intervals valid for a time interval for said tiles.

3. The method of claim 1 including computing depth intervals valid within a region of lens coordinates for said tiles.

4. The method of claim 3 including rejecting a tile if it is outside said depth intervals.

5. The method of claim 4 including rejecting individual samples using said depth intervals.

6. The method of claim 5 including using said depth intervals for pixel shading.

7. The method of claim 1 including computing per triangle constants for bounding.

8. The method of claim 7 including using said constants for computing said depth intervals.

9. A non-transitory computer readable medium storing instructions to enable a processor to perform the steps of:
   computing depth intervals, using a moving plane equation having a depth greater than that of a moving and defocused triangle, for a plurality of tiles for said moving and defocused triangle;
   rejecting a tile if it is outside a valid range in a depth interval; and
   rendering an image without said one or more rejected tiles determined from said computed depth intervals for a graphics processor to obtain high quality motion-blurred images.

10. The medium of claim 9 including computing depth intervals valid for a time interval for said tiles.

11. The medium of claim 9 including computing depth intervals valid within a region of lens coordinates for said tiles.

12. The medium of claim 11 including rejecting a tile if it is outside said depth intervals.

13. The medium of claim 12 including rejecting individual samples using said depth intervals.

14. The medium of claim 13 including using said depth intervals for pixel shading.

15. The medium of claim 9 including computing per triangle constants for bounding.

16. The medium of claim 15 including using said constants for computing said depth intervals.

17. An apparatus comprising:
   a processor to compute depth intervals using a moving plane equation having a depth greater than that of a moving and defocused triangle for a plurality of tiles for said moving and defocused triangle, reject one or more tiles if the one or more tiles are outside a valid range in a depth interval and render an image without said one or more rejected tiles determined from said computed depth intervals for a graphics processor to obtain high quality motion-blurred images; and
   a memory coupled to said processor.

18. The apparatus of claim 17, said processor to compute depth intervals valid for a time interval for said tiles.

19. The apparatus of claim 17, said processor to compute depth intervals valid within a region of lens coordinates for said tiles.

20. The apparatus of claim 19, said processor to reject a tile if it is outside said depth intervals.

21. The apparatus of claim 20, said processor to reject individual samples using said depth intervals.

22. The apparatus of claim 21, said processor to use said depth intervals for pixel shading.

23. The apparatus of claim 17, said processor to compute per triangle constants for bounding.

24. The apparatus of claim 23, said processor to use said constants for computing said depth intervals.

25. The apparatus of claim 17 wherein said processor is a graphics processing unit.

* * * * *